United States Patent
Bouchard et al.

(10) Patent No.: US 6,906,736 B2
(45) Date of Patent: Jun. 14, 2005

(54) TECHNIQUE FOR PRINTING A COLOR IMAGE

(75) Inventors: Alain Bouchard, Boston, MA (US); Anemarie DeYoung, Lexington, MA (US); Stephen J. Telfer, Arlington, MA (US); William T. Vetterling, Lexington, MA (US)

(73) Assignee: Polaroid Corporation, Waltham, MA (US)

( * ) Notice: Subject to any disclaimer, the term of this patent is extended or adjusted under 35 U.S.C. 154(b) by 334 days.

(21) Appl. No.: 10/078,644

(22) Filed: Feb. 19, 2002

(65) Prior Publication Data

US 2003/0156181 A1 Aug. 21, 2003

(51) Int. Cl.[7] .............................. B41J 2/21; B41J 2/525
(52) U.S. Cl. ......................................... 347/176; 347/43
(58) Field of Search ................................. 347/172, 173, 347/174, 176, 41, 42, 43

(56) References Cited

U.S. PATENT DOCUMENTS

| | | | |
|---|---|---|---|
| 4,805,033 A | 2/1989 | Nishikawa | 358/298 |
| 4,809,063 A | 2/1989 | Moriguchi et al. | 358/75 |
| 4,884,080 A | 11/1989 | Hirahara et al. | 346/46 |
| 5,721,578 A | 2/1998 | Nakai et al. | 347/183 |
| 5,786,900 A | 7/1998 | Sawano et al. | 358/298 |
| 5,818,474 A | 10/1998 | Takahashi et al. | 347/15 |
| 6,005,596 A | 12/1999 | Yoshida et al. | 347/176 |
| 6,226,021 B1 | 5/2001 | Kobayashi et al. | 347/183 |
| 6,293,651 B1 | 9/2001 | Sawano et al. | 347/40 |
| 6,425,699 B1 | 7/2002 | Doval et al. | 400/582 |
| 6,842,186 B2 * | 1/2005 | Bouchard et al. | 347/188 |

FOREIGN PATENT DOCUMENTS

| | | | |
|---|---|---|---|
| EP | 0 791 472 A2 | 2/1997 | B41J/19/78 |
| EP | 1 201 449 A2 | 10/2001 | B41J/29/393 |

* cited by examiner

*Primary Examiner*—Huan Tran

(57) ABSTRACT

A technique for optimizing or enhancing color images. Embodiments are disclosed for creating an enhanced color image, including the enhancement of perceived color uniformity. In a "dot-on-dot" registration scheme for producing color images, the dots need to be precisely superimposed on each other to provide optimum or enhanced images. The dot-on-dot registration produced by a single head thermal printer is generally acceptable, but a single head machine is very slow because multiple passes (reciprocation) are required to lay down multiple colors of dots. In a much faster multi-head or tandem thermal imaging system a serious problem of dot misalignment may cause moire patterns or other visual artifacts in the color images produced by dot patterns. A solution to this problem is disclosed herein which intentionally misregisters superimposed dots in a novel and particular manner to achieve image optimization. In a particular embodiment a first thermal print head has a first number of thermal elements energized at a first rate and a second thermal print head has a second number of thermal elements energized at a second rate. The numbers of thermal elements and rates of energization are selected to cause intentional misregistration at a high spatial frequency which is unnoticeable to the naked eye of a viewer of the image, thereby masking any unintentional mechanical misalignment of the print heads while maintaining imperceptible the intentional misregistration of the solution to the problem.

29 Claims, 6 Drawing Sheets

TECHNIQUE FOR PRINTING A COLOR IMAGE

BACKGROUND OF THE INVENTION

1. Field of the Invention

The present invention relates to creating images by techniques including a thermal imaging technique, and, more particularly, relates to a system, apparatus, computer program product and/or method for enhancing color uniformity of images produced by way of a printer having multiple thermal print heads.

2. Description of Prior Art

Many people enjoy reading the "Parade" section of their local Sunday newspaper and are usually enticed by the multicolored pictures on its first cover page. If one were to apply a magnifying glass to those pictures, the underlying dot patterns from which those pictures are composed would be readily discernable. This process of composing pictures by dot patterns is well established. Such patterns can be rendered by various methods including traditional offset printing, and digital imaging techniques such as electrophotographic, ink-jet and thermal imaging processes. In digital photography, similar dot patterns are used to create images.

Technology underlying the rendition of digitally-photographed images, i.e., the permanent recording of images on paper or on similar substrate material, is continually evolving. As one example of such current technology, reference may be made to U.S. patent application Ser. No. 09/872,424, filed May 30, 2001, assigned to the assignee of the instant application, entitled: "A High Speed Photo-Finishing Apparatus", having co-inventors S. J. Telfer, M. L. Reisch, A. Bouchard, S. B. Lawrence, B. D. Busch, and M. S. Viola, (now abandoned and replaced by U.S. patent application Ser. No. 10/080,186, filed Feb. 22, 2002 and issued as U.S. Pat. No. 6,842,186) which, along with all of its incorporated-by-reference U.S. Pat. Nos. [5,694,484; 6,069,982; 6,128,415; 5,809,164; 4,385,302; 4,447,818; 4,540,992; 5,285,220; 5,711,620; 5,569,347; 5,521,626; 5,897,254; 4,686,549; and 5,244,861] and patent applications, is hereby incorporated by reference herein in its entirety.

One technique used in producing "pictures" from digital photography is thermal imaging. In one process for thermal imaging, a thermal print head containing a single column of a number of linearly-disposed thermal print head heating elements can be used. The elements are pressed against the back side of an ink donor ribbon or tape which, in turn, has its ink side pressed against an ink-receptor substrate, which may be paper (or a material having similar reflective properties to paper) bearing a suitable coating for receiving the ink or dye. The two substrates are moved in a direction perpendicular to the column of elements, which are heated by electrical pulses and which cause the ink to liquefy at various points of contact between each element and the donor ribbon corresponding to the occurrence of the pulses. (Hereinafter vertical formations shall be termed "columns" which are defined perpendicular to direction of substrate motion, and horizontal formations shall be termed "rows" which are defined parallel to direction of substrate motion.) The liquefied ink from the donor ribbon is then registered as dots onto the receiver substrate against which the donor ribbon is being pressed. The image is formed as an array of dots (pixels) in the color of the donor ribbon's ink color. Variation in level of color in the image may be achieved by means of two possible methods. In the first method, the area coverage of dye is approximately constant over the whole area of the pixel, and the amount of dye (the dye "density") of approximately constant coverage varies according to the amount of energy supplied by the print head to that particular pixel. This method is hereinafter referred to as "variable density" printing, and is commonly practiced in the thermal transfer imaging technique known as "dye diffusion thermal transfer", or D2T2. In the second method, the size of dots within the area of one pixel varies according to energy supplied by the print head, these dots containing only a single density of dye (de facto, its maximum density). The dots are so small that they cannot be individually distinguished by the naked eye, and so the overall level of color is perceived as an average of the almost total absorption of light in the proportion of the viewed area occupied by dots, and the almost complete (diffuse) reflection of light in unprinted areas. This technique of thermal transfer printing is known hereinafter as "variable dot" printing. A particularly preferred method for variable dot imaging is disclosed in U.S. patent application Ser. No. 09/745,700, filed Dec. 21, 2000, entitled: "Thermal Transfer Recording System", having co-inventors Michael J. Arnost, Alain Bouchard, Yongqi Deng, Edward J. Dombrowski, Russell A. Gaudiana, Fariza B. Hasan, Serajul Haque, John L. Marshall, Stephen J. Telfer, William T. Vetterling and Michael S. Viola, now U.S. Pat. No. 6,537,410 and in U.S. provisional patent application Ser. No. 60/294,528, filed May 30, 2001, entitled: "Thermal Mass Transfer Imaging System", having co-inventors Edward P. Lindholm, Stephen J. Telfer and Michael S. Viola, (the benefit of which was claimed in U.S. patent application Ser. No. 10/159871, filed May 30, 2003, now U.S. Pat. No. 6,761,788) both of which are assigned to the assignee of the instant application, and both of which, along with all of their incorporated-by-reference patents and patent applications, are hereby incorporated by reference herein in their entireties.

In order to create a "color picture", multiple colors are needed (typically, the three subtractive primary colors—cyan, magenta, and yellow, although other colors, e.g., black, may be added). In variable dot printing, registration of dots of the three different colors with respect to one another can influence the visual appearance of the picture. In one common practice, known hereinafter as "dot-on-dot" printing, wherein the printing system uses only one thermal print head, a single donor ribbon containing three separate donor colors in repetitive sequence is used in a predetermined order: e.g., cyan, magenta, yellow (followed by a protective clear overcoat). In this process, a repetitive reciprocation of the media must be used to first apply dots of cyan color, then dots of magenta color superimposed exactly on the first dots, and then dots of yellow color superimposed exactly on the dots of the first two colors. As described above, by varying size of each deposition of each color on each dot, one can create a visual image to the naked eye in which dots are invisible and the resulting effect is a multicolored picture when viewing all dots at once. Dot patterns can have densities of approximately 300 by 300 dots per inch (dpi), with dot size ranging in size from approximately 10 to approximately 100 microns. Shape of the dots may vary, but they are commonly substantially circular. A disadvantage of using only one print head is the requirement for multiple passes under the same head (reciprocation) of the receiver substrate containing the dot patterns, which is cumbersome and time consuming. This disadvantage is somewhat offset by the advantage that registration of the dots is relatively straightforward, since the same mechanical system is used to print all three colors. Therefore, a single print head machine can be advantageously used for small, portable tasks, providing good dot-on-dot registration. But, to take advantage of the speed afforded by the preferred method for variable dot printing, one would need to utilize a multiple-head machine.

In a multiple thermal print head machine (tandem printer) each print head is fed its own single-colored donor (i.e., the machine is equipped with a cyan-printing head, a magenta-printing head, and a yellow-printing head). This allows a single pass in one direction of the receptor substrate, greatly speeding up the printing process. However, in this case the three colors are not printed by the same mechanical system, and as a result errors in registration between the colors may occur. Sources of error include but are not limited to: (1) the misalignment of the print heads relative to one another in directions parallel and perpendicular to the motion of the receiver substrate; (2) a skew (angular) misalignment between the printheads; (3) a direction of tracking of the receiver substrate that is not exactly perpendicular to the printheads (or any mistracking or wandering of the receiver substrate); (4) a stretching of the receiver between print heads, which will be influenced by the tension in the receiver between print heads, and which may differ between one pair of print heads and another; (5) a "bag" or "sag" in the receiver between print heads, which will also change the distance between print heads, and may particularly occur in a curved or arcuate receiver path; (6) any roller eccentricities in the receiver path, which will change the effective distance between print heads; and, (7) other mechanical problems, such as slippage of the receiver substrate in the drive mechanism and motor irregularities. Moreover, changes in registration may occur as a result of changes in the above variables with environmental changes, particularly ambient temperature. Gross alignment (i.e., to within about one pixel spacing) of the colored dots in the direction of motion of the substrate is usually not a serious problem because misalignments in that direction can be compensated by varying the time interval, for example, between excitations of the first head's heating elements and excitations of the second and subsequent heads' heating elements. With the substrate moving at constant velocity, time interval variation can accommodate and compensate for distance variation. Likewise, correction of certain of the above-mentioned other problems at the level of the pixel spacing may be achievable with good mechanical design. Unfortunately, however, the level of dot registration required for good image quality in variable dot imaging, using the "dot-on-dot" technique, is far more stringent than one pixel spacing. In fact, as discussed below, registration on the order of a few micrometers is necessary for this technique.

When operating under constraints of a "dot-on-dot" technique, even slight misregistration of superimposed dots can be visually noticeable at least as a color shift or a lack of uniformity of color. This color nonuniformity can be noticed as an erroneous variation in color across a single image (e.g.: an object of uniform color that appears gray-brown on the left-hand side of an image may appear to be blue-brown at the right-hand side of the image). Alternatively, or additionally, this color nonuniformity can be noticed as an erroneous variation in overall color tone from a first print of an image to succeeding prints of the same image.

The reason for this problem in color uniformity can be explained from the physics underlying absorption and reflectivity of different wavelengths of light. Visible light is electromagnetic radiation having wavelengths in the range of approximately 400–700 nanometers. The three so-called primary colors are red, green and blue. Light having wavelengths of approximately 400–500 nanometers appears blue, light of wavelengths of approximately 500–600 nanometers appears green, and light of wavelengths of approximately 600–700 nanometers appears red. Dyes and pigments are materials which selectively absorb certain wavelengths of visible light, and transmit the rest. Yellow dyes absorb blue light, magenta dyes absorb green light, and cyan dyes absorb red light. Black dyes absorb across the whole visible spectrum. When a paper printed with dyes is illuminated, the light which is not absorbed by the printed dyes is diffusely reflected back towards the viewer. The appearance of different colors arises from the subtraction of differing proportions of light at different visible wavelengths.

The color shifts that stem from dot misregistration are a result of overlap in the absorption spectra of the dyes. To appreciate this, consider a surface area "A" half of whose area is completely covered by two ink dye colors with a first dye covering half of area A placed congruently upon a second dye also covering the same half of area A. The first ink dye almost completely absorbs light of red wavelengths but also absorbs a small proportion (for example, 10%) of light of green wavelengths. The second ink dye completely absorbs light of green wavelengths but also absorbs a small proportion (for example, 20%) of light of red wavelengths. Under this condition, which is an example of a "dot-on dot" printing using dyes whose absorption spectra overlap, half of the red and green light impinging on area A is absorbed, and half is reflected. This is because all red and green light impinging on the half of area A bearing the dyes is absorbed, regardless of the overlap of the dye spectra (i.e. no more than all of the red light can be absorbed and no more than all of the green light can be absorbed), whereas none of the red or green light impinging upon the half of area A which bears no dye is absorbed. But, what happens if superimposed dots meander from their "bulls-eye" position so that there is only partial overlap, or even no overlap at all with just side-by-side positioning?

To answer that question, consider the opposite extreme, the side by side case, where both dots now comprise area A, each dot covering 50% of area A. The total amount of green light reflected from Area A is in this case 45% and the total amount of red light reflected from Area A is 40%. [These reflections are based on reducing the otherwise 50% reflection amounts by amounts equal to 10% of 50% A and 20% of 50% A respectively.] The result is twofold: First, area A looks darker than in the "dot-on-dot" case, because the total reflected light is reduced in intensity from 50% reflected red and green light to 40% reflected red and 45% reflected green light. Second, the combined effect of the now-unequal absorbed-red light and absorbed-green light contributions produce a different color from that perceived when the proportions of absorbed red and green light were equal. An exact "dot-off-dot" pattern, or an exact "dot-on-dot" pattern, would each produce a uniform perceived color, although the two colors would be different. But misalignment of a dot-on-dot pattern, or a dot-off-dot pattern, such that in some areas of the image the dots were registered perfectly, and in other areas of the image the dots were entirely non-overlapping, would be manifest as a color variation in the image.

This problem is further described in, for example, "An Investigation of Color Variation as a Function of Register in Dot-On-Dot Multicolor Halftone Printing", Jang-fun Chen, M. S. Thesis, Rochester Institute of Technology, 1983, in which it is stated: "It has been observed that color reproduced with dot-on-dot method is extremely sensitive to minute variation in register". Therefore, the generally unavoidable spectral overlap of various dyes used in dot patterns (regardless of how the patterns were created—by thermal imaging, by inkjet, by printing press, etc.) can cause an imaging problem in the case of imperfect registration of identical dot patterns of different colors. Superimposed dot patterns that misregister, or meander from "dot-coincidence" to "dot-miss" in an unguided or unsupervised manner because of the above-noted mechanical misalignment with regard to tandem thermal print head machines, or because of other factors with regard to other printing schemes, create color and intensity variations in an image which are perceptible to the naked human eye. The printing press arts attempt to deal with this problem by rotating orthogonal screens, screens having equal resolution in both orthogonal directions, rotating one screen color relative to the other to shift the interference pattern to a high spatial frequency not visible to the naked eye. In the particular case of thermal printing using more than one linear resistor array, wherein each such array has the same fixed dot spacing, misalignment of dots in a direction perpendicular to the direction of motion of the receiver substrate is almost inevitable and can currently be corrected only by measurement of the misalignment and mechanically repositioning one or more of the print heads. Obviously, this approach is cumbersome.

Since the photographic industry is moving rapidly to digital camera photography, since printing speed is a very important factor in producing photographs at retail locations, and since the preferred variable dot thermal transfer printing technology referred to above will allow a fast printing speed of digital images, there is strong motivation to overcome any outstanding difficulties with the technique. Accordingly, there is a need to find a solution to the serious mechanical misalignment problem that arises when using a tandem printer with multiple print heads. Embodiments of the present invention present welcome solutions to these problems of the prior art.

SUMMARY OF THE INVENTION

Embodiments of the present invention relate to a system, apparatus, computer program product and/or method, for enhancing a printed color image as perceived by a human viewer. The image is composed of a plurality of superimposed regular dot-patterns upon a planar surface. The surface moves in a first direction parallel to the surface. Each dot pattern has a fixed spatial frequency in the first direction (dots are substantially equidistant from each other in the first direction) and another fixed spatial frequency in a second direction (dots are substantially equidistant from each other in the second direction) perpendicular to the first direction. These two spatial frequencies for a particular dot pattern need not be equal and are not equal to spatial frequencies of the other pattern. Each one of the patterns is monochromatic and different in color from that of each of the other patterns. One of the regular dot patterns is intentionally misregistered with respect to another of the patterns in directions only parallel to and perpendicular to the first direction by virtue of its having different spatial frequencies from that of the other pattern in both the first direction and second direction, thereby obtaining a pattern misregistration. The pattern misregistration is controlled to obtain a particular misregistration having the property of enhancing the color image while the particular misregistration remains imperceptible to the viewer. The misregistration is designed to subdue color variations within an image, and from image to image, while producing no image artifacts visible to the viewer. Enhancing the color image includes enhancing the color uniformity of the image.

In another aspect, the image is composed of a plurality of superimposed regular dot patterns upon a portion of a movable curved surface having two orthogonal spatial dimensions and having curvature in only one of those dimensions, the direction of motion of the surface being in the one of those dimensions, defined as a first direction. For example, the curved surface can be elliptical—elliptically shaped in cross section where the surface moves in the first direction perpendicular to the locus of points of its foci. Or, as another example, the curved surface can be cylindrical—a portion of a cylindrical surface which moves in the first direction perpendicular to the axis of rotation of the cylindrical surface. On any of these curved surfaces, one of the dot patterns is intentionally misregistered with respect to another of the dot patterns in directions only parallel and perpendicular to the first direction.

In another feature, embodiments of the present invention relate to creating an image composed of a plurality of superimposed regular dot patterns upon a planar surface, each one of the patterns being monochromatic and different in color from the other patterns. The surface moves in a first direction parallel to the surface. At least one of the regular dot patterns is intentionally misregistered with respect to at least one of the other patterns in directions only parallel to and perpendicular to the first direction. The pattern misregistration is controlled to obtain a particular misregistration having the property of enhancing color image uniformity while the particular misregistration is not perceptible to the viewer.

In a further feature, an improved color image on a movable planar surface using multiple arrays of dots is created. The surface moves in a first direction parallel to the surface. The image has at least enhanced color uniformity as perceived by a human viewer of the image. A first one of the arrays is created in a first color as a first colored array on the surface; the dots forming the first colored array are spaced at first predetermined distances from each other. A second one of the arrays is created in a second color as a second colored array generally superimposed on the first colored array; the dots forming the second colored array are spaced at second predetermined distances from each other. All of the first predetermined distances which are parallel to and perpendicular to the first direction and all of the second predetermined distances which are parallel to and perpendicular to the first direction are controlled to result in a particular intentional misregistration between the dots of the second colored array and the dots of the first colored array, the misregistration having the property of improving the color uniformity of the image for the viewer. A third one of the arrays is created in a third color as a third colored array, generally superimposed on the second colored array and said first colored array. The dots forming the third colored array are controlled to be spaced at third predetermined distances not aligned with the first or second array. When the colors printed are yellow, magenta and cyan, the predetermined distances chosen for printing yellow and cyan can be the same. (This is because the spectral overlap between yellow and cyan is typically insignificant. Magenta, the color obtained by absorbing green light, is the "middle" color in the spectrum and overlaps the others on both sides.)

In a still further embodiment, thermal imaging is used and the surface is a receiver substrate. The substrate is typically a web and is reeled in a first direction at a first speed. First, second, and third thermal print heads are displaced from each other in the first direction and are each fixedly mounted relative to the moving receiver. The first head includes a first predetermined number of elements linearly and regularly displaced over a fixed distance in a direction parallel to the surface and perpendicular to the first direction. This fixed distance defines one dimension of a field of view of the image. The second head includes a second predetermined number of elements linearly and regularly displaced over the fixed distance within the field of view and in a direction parallel to the surface and perpendicular to the first direction. The third head includes a third predetermined number of elements linearly and regularly displaced over the fixed distance within the field of view and in a direction parallel to the surface and perpendicular to the first direction. Separate ink donor ribbons in the colors of cyan, magenta, and yellow are used with the three print heads. Any order of printing of the colors may be used. However, as described above, the misregistration issue chiefly occurs between magenta and the two other colors. Therefore, in a three head system, the resolution of the printheads used to print yellow and cyan may be the same, whereas the resolution of the printhead used to print magenta should be different from the resolution of either the printhead used to print yellow or the printhead used to print cyan. When a fourth head associated with black is included, resolution of that fourth head should differ from resolutions of the three remaining heads.

In yet another feature, the first and second predetermined distances are controlled in the following manner. A clock generator generates a plurality of timing clock pulse trains. A computer-controlled pulse generator is operatively coupled to the clock generator and provides a plurality of outputs of excitation pulse bursts in timed sequence with at least one of the clock pulse trains. Each one of the first predetermined number of thermally controlled print head elements of the first print head is operatively coupled to a like number of a first group of outputs respectively from the pulse generator. Each one of the second predetermined number of thermally controlled print head elements of the second print head is operatively coupled to a like number of a second group of outputs respectively from the pulse generator. Each one of the third predetermined number of thermally controlled print head elements of the third print head is operatively coupled to a like number of a third group of outputs respectively from the pulse generator. The spacing of dots along the first direction is determined by the time intervals between pulse bursts. As discussed earlier, the time intervals for the head printing yellow may be made the same as the time intervals for the head printing cyan, insofar as there is usually only minor spectral overlap between these two dyes.

In a particular embodiment, each element of the cyan-printing head and each element of the yellow-printing head deposit 400 dots per inch on the surface within the field of view of the image, with each respective one of the 400 dots per inch from the yellow-printing head intending to be deposited upon or directly upon its corresponding one of the 400 dots per inch from the first print head. Since there is minimal spectral overlap between these colors, although being subjected to a dot-on-dot procedure, precise registration of the yellow and cyan dots is unnecessary. Each element of the print head which prints magenta, is controlled to deposit 266 dots per inch on the surface throughout the field of view. In this embodiment, the first and third thermal print head's predetermined number of elements is 300 per inch each, and the second thermal print head's predetermined number of elements is 400 per inch. The intermingling of a column of 300 dots per inch by a row of 400 dots per inch pattern with a column of 400 dots per inch by a row of 266 dots per inch pattern over the field of view in this manner has the property of enhancing color uniformity of the image for the viewer, each one of the dots being individually indistinguishable to a naked eye of the viewer. Other colors and combinations of numbers of dots can be used.

It is therefore advantageous to use embodiments of the present invention in the production of images obtained through digital photography whereby a high rate of image production and enhanced image uniformity are achieved, while misalignment problems are minimized.

It is thus a general object of the present invention to provide an improved technique for printing images.

It is another general object of the present invention to provide an improved technique for creating color images produced through digital photography.

It is still another object of the invention to provide an improved technique for creating color images utilizing a multi-head, thermal imaging machine, an ink-jet machine, or other technique relying on dot patterns.

Other objects and advantages will be understood after referring to the detailed description of the preferred embodiments and to the appended drawings wherein:

INTRODUCTION

Figure 1:
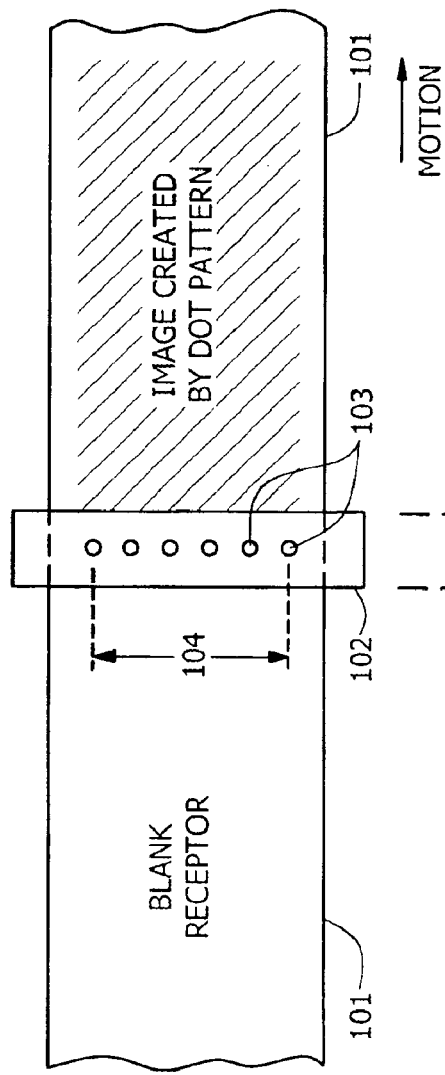
FIG. 1 is a schematic diagram of a single head thermal imaging machine.
Figure 2:
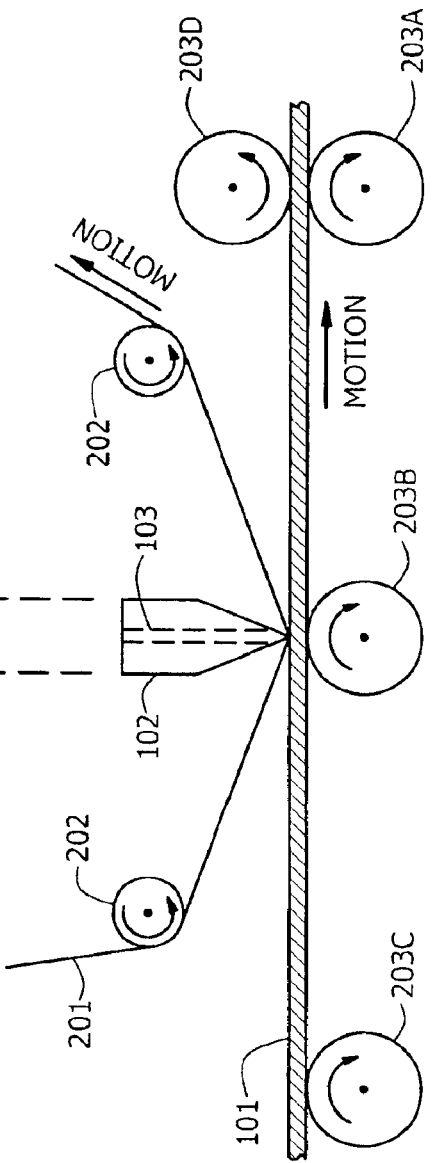
FIG. 2 is schematic diagram showing another view of the single head thermal imaging machine of FIG. 1.

FIGS. 1&2—Single Head Machine

FIG. 1 is a plan-view, schematic diagram of a portion of a single head thermal imaging machine. Receptor substrate 101 is formed as a web or ribbon of paper or some other usable material and moves in the direction from left to right as shown. It passes underneath thermal print head 102 which is oriented perpendicularly to the receptor's direction of motion. Heating elements 103 are contained within print head 102. Heating elements 103 are linearly and usually regularly (substantially equidistantly) displaced over fixed distance 104, are aligned perpendicularly to the direction of motion of receptor 101, and protrude beyond the housing of the print head in a manner to make operative contact with a tape or ribbon of ink donor material (not shown in this Fig.). Fixed distance 104 defines one dimension of the field of view of the image to be created upon the receptor. For purposes of enhancing clarity of illustration, a small number of elements 103 are shown, but typically, several hundred of such elements per inch may be employed in thermal imaging print heads. On the left hand side of print head 102 the receptor paper is shown as blank, where its right hand side is lined to suggest an image created by operation of the print head and thermal heating elements, to be described hereinbelow.

FIG. 2 is a side view, schematic diagram related to the single head thermal imaging machine of FIG. 1, but some detail shown in FIG. 2 is not shown in FIG. 1. Receptor 101 is supported by rollers 203A, 203B, and 203C which enable the receptor to move in the direction shown. Capstan drive mechanism 203D is shown opposite support/guide roller 203A, and causes the receptor to move. Platen roller 203B is typically coated with a rubber material to ensure uniform contact between the print head, donor ribbon, and substrate over the whole width of the area to be printed. Roller 203C is an optional guide roller. The heating elements of print head 102 are shown in contact with ink donor tape or ribbon 201 which is supported by rollers 202 enabling the donor to move in the same direction as receptor 101 and at the same speed as receptor 101. The donor ribbon makes contact with the receptor substrate at least at the point where they pass heating elements 103. There may be a supply reel (not shown) for receptor substrate 101 and there is a supply reel (not shown) and take-up reel (not shown) for donor ribbon 201. More detailed discussion about the structure of thermal imaging systems is provided in the incorporated by reference patents and patent applications.

In operation, each heating element 103 may be electrically energized by electrical pulses from a pulse generator (not shown in these two Figures). The temperature of each element may thus be precisely raised and lowered above and below that threshold temperature required to liquefy the otherwise non-liquid ink or other like marking substance contained on donor ribbon 201. Each heating element 103 in the column can be independently heated to a different temperature, up to a predetermined temperature limit. The temperature of each heating element determines the quantity of ink liquefied, the quantity of ink being related to the size of dot created, whereby a linear column of differently sized ink dots can be generated with each successive energization of the column of heating elements. Multiple columns (vertical formations) of dots lined up in parallel will form a two dimensional array or pattern of dots on the receptor surface, and if those dots are varied in size in a particular manner then a particular image will emerge when viewed by the naked eye of a human viewer. Each dot is on the order of 10–100 microns in diameter, although not necessarily circular, and is too small to be seen by the naked eye. If a particular element receives no energization in a particular pulse burst, then it will not liquefy ink on the donor ribbon with which it makes contact. In this operation, the donor ribbon contains ink of a single color, which is the color of the image created upon the receptor substrate. In order to generate a color image, a second donor ribbon with a different color must be used and the foregoing operation must be repeated to create a second pattern of dots in the second color superimposed on the first set of dots. Then one or more additional donors must be used to form the final image. The absolute and relative amounts of ink of each color forming each particular dot will result in a particular color contribution from that particular dot. Each such contribution from each such dot taken together, and integrated by the human eye, will form the color image as perceived by the human optical system. More detailed discussion about the operation of thermal imaging machines is presented in the incorporated by reference patents and patent applications. As earlier discussed, the requirement to change donor dye color with a single head machine is very cumbersome and time consuming; this problem is avoided by use of a tandem head machine with a different color associated with each head, to be described next.

DESCRIPTION OF THE PREFERRED EMBODIMENTS

Figure 3:
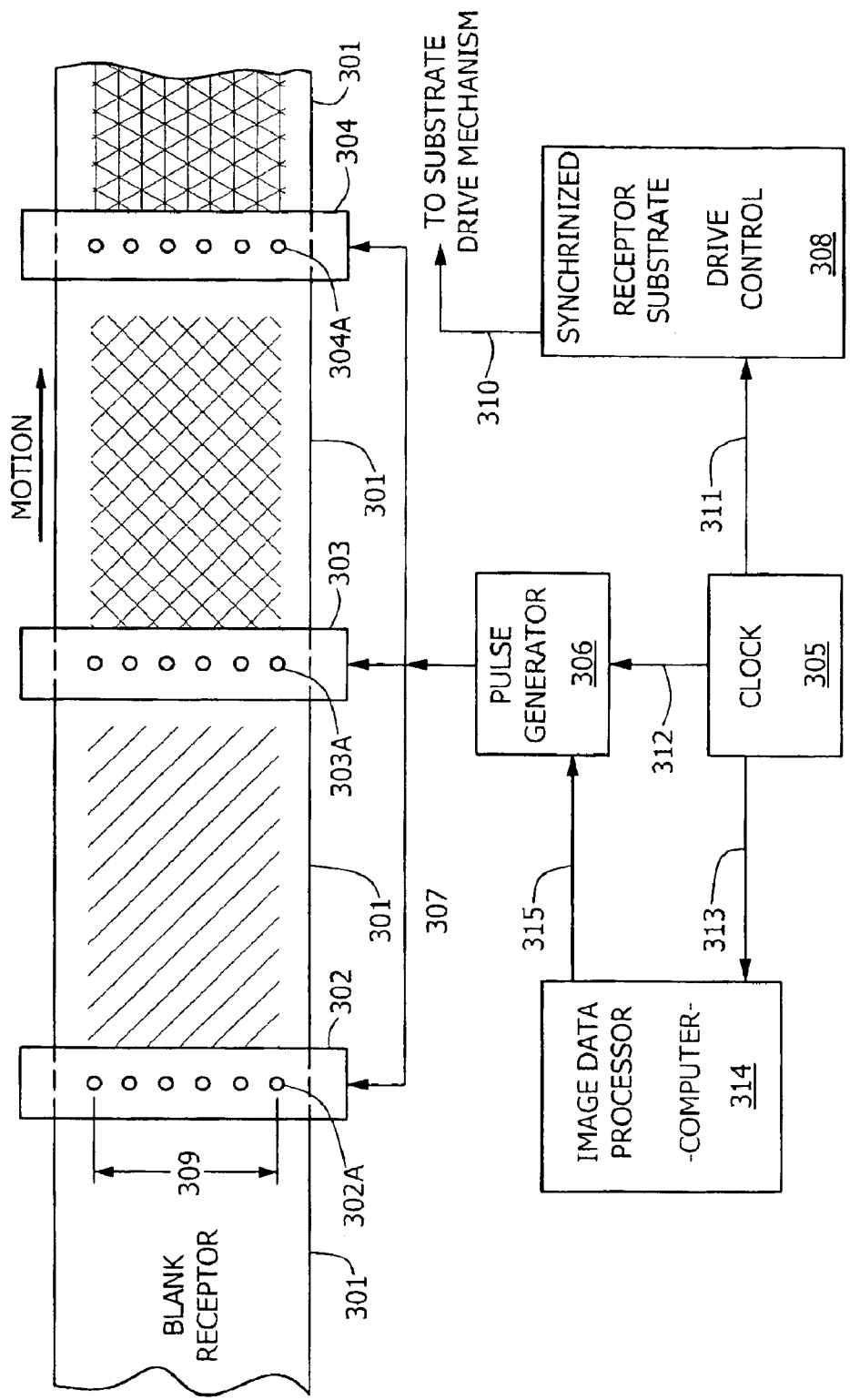
FIG. 3 is a schematic diagram of a three head thermal imaging machine of the type that can be used with embodiments of the present invention.
Figure 4:
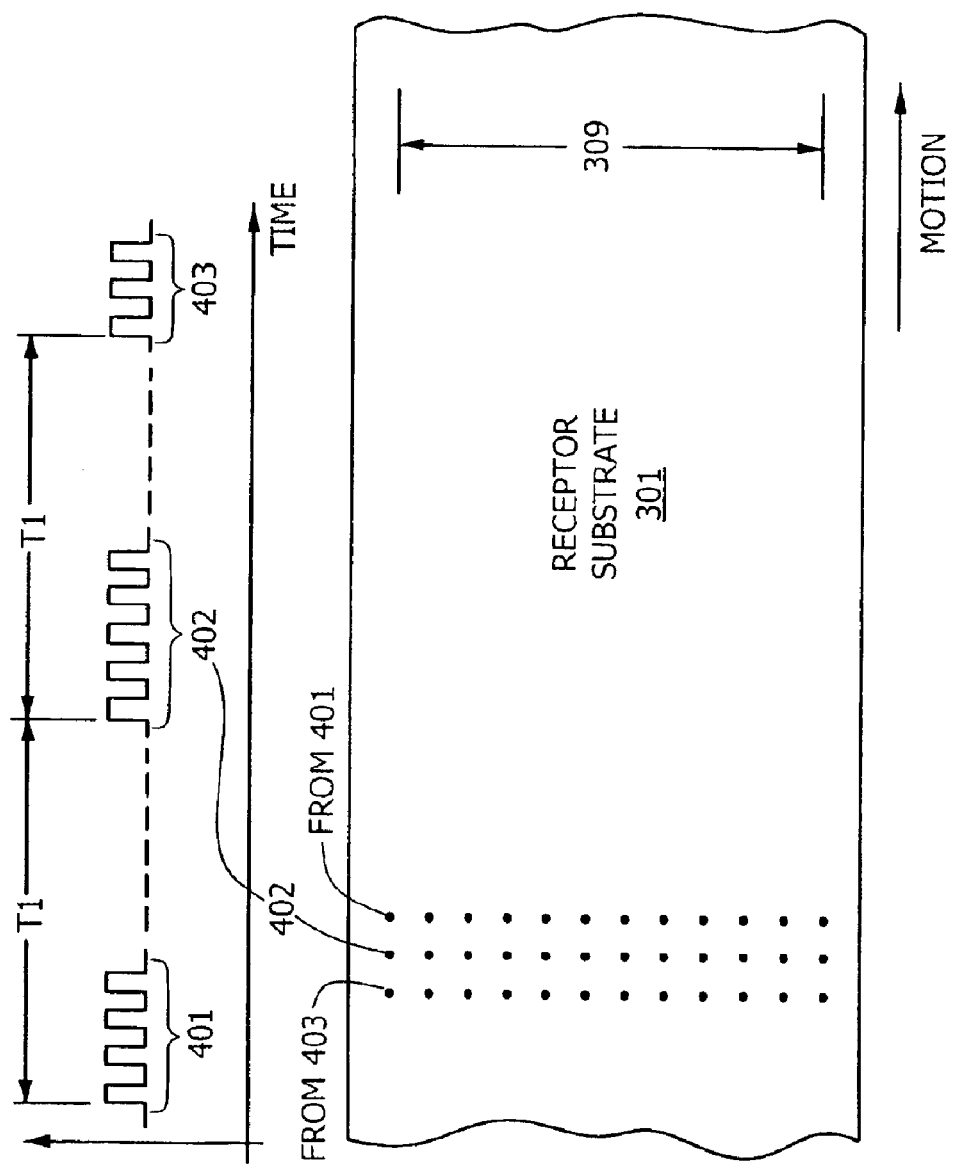
FIG. 4 is a timing diagram showing the timing of excitation pulses and their relationship to dot patterns such as those produced by operation of the machine of FIG. 3.

FIGS. 3 & 4—Three Head Machine and Timing

FIG. 3 is a plan view, schematic diagram of a three head thermal imaging machine of the type which can be employed in embodiments of the present invention. Receptor 301 moves from left to right in a first direction shown underneath three thermal print heads 302, 303, and 304. The portion of the receptor under the three heads can lie in a generally planar surface. Other receptor support configurations, such as those forming the receptor into a portion of a curved surface, such as a portion of a cylindricalsurface having circular cross section, or other curved surface having, for example an elliptical or arcuate cross section, etc. can be used without deviating from application of the principles of the present invention. Referring back to FIG. 2, it should be understood that receptor substrate 101 could have been arranged to slide or move over any curved surface with curvature in only one of two orthogonal spatial dimensions, such as cylindrical or elliptical surfaces. The direction of motion of the receptor would then be in the direction of curvature of the curved surface. The precise shape of the surface of the receptor can vary without departing from the spirit or scope of the present invention.

The print heads are both displaced from each other along, and oriented perpendicular to, the direction of motion as shown. Each print head contains its respective linearly and regularly displaced (over fixed distance 309) single column of a predetermined number of thermally controlled print head elements 302A, 303A, and 304A respectively. The predetermined number for at least two of these print heads is different in accordance with principles of the present invention. Fixed distance 309 defines one dimension of the field of view of the image being created by the elements on the receptor. Three different color donor ribbons (not shown to enhance clarity of presentation) are used, one with each print head in a manner similar to that shown in FIG. 2. For example, a cyan color donor ribbon can be used with print head 302, a magenta color donor ribbon can be used with print head 303 and a yellow color donor ribbon can be used with print head 304.

The portion of receptor 301 directly to the right of print head 302 contains unidirectional cross hatching to imply an image over a field of view composed of a pattern of cyan colored (uni-color) dots. The portion of receptor 301 downstream from and directly to the right of print head 303 contains bidirectional cross hatching to imply an image over that same field of view composed of a pattern of magenta colored dots superimposed upon the pattern of cyan colored dots. Finally, the portion of receptor 301 directly to the right of print head 304 contains tri-directional cross hatching to imply an image of a pattern of yellow dots superimposed upon an image of magenta colored dots which, in turn, are superimposed upon the pattern of cyan colored dots, which represents the completed colored image. There is yet a fourth thermal print head (not shown), termed the "overcoat" print head, which is oriented in the same direction as those shown and displaced downstream from print head 304 in the direction of motion. The overcoat print head merely provides a layer of protection over the completed color image, such layer being a clear coating of plastic or polymeric material.

Clock 305 provides timing for operation of the tandem or multiple head machine of FIG. 3. The clock provides a plurality of timing pulse trains via conductive link 312 to pulse generator 306, via conductive link 313 to image data processor or computer 314, and via conductive link 311 to synchronized drive control 308. The pulse trains have selectable repetition rates to enable proper placement of intentionally misregistered dot patterns within the field of view of a particular image. Output 310 from drive control 308 provides timing pulses to a receptor drive mechanism (not shown) to synchronize the speed of motion of receptor substrate 301 with the energization of thermal print head heating elements 302A, 303A, and 304A. Such energization is provided by bursts of electrical pulses generated by pulse generator 306 in synchronization with the various timing pulse trains from clock 305 and, therefore, in synchronization with the speed of motion of the receptor substrate.

The precise burst for a particular heating element of a particular thermal print head within a particular column of dots being printed is generated by pulse generator 306 which is controlled by image data processor 314 over conductive link 315. In other words, processor 314 receives image data from, for example, a digital camera (not shown). Processor 314 utilizes certain software dedicated to the task of controlling the system of FIG. 3 to print dots of different colors in a specified manner. The computer processes that image data in a manner to cause pulse generator 306 to generate the amount of electrical energy necessary to liquefy the precise amount of ink in the desired color at the correct time to cause a deposition of that amount of liquefied ink upon the receptor substrate, or upon all or a portion of an ink dot previously deposited on the receptor substrate. Image data may be processed in image data processor 314 to cause the system of FIG. 3 to print dots of different colors in a specified manner according to the present invention in the following way:

The source digital image file (which may be in any of a variety of different standard formats) is read and, if necessary, decompressed. It is then cropped to a standard aspect ratio, which is typically chosen to be 2:3, and resized to a standard size, typically 1248 by 1872 pixels. Each pixel is assigned a color value in each of yellow, magenta and cyan, recorded at a resolution of 8 bits per pixel per color. The monochrome images in yellow, magenta and cyan that together make up the color image may be referred to as "color planes". The foregoing procedure results in a standard file that is then further transformed to give the dot patterns of the present invention, as described below.

Firstly, each color plane of the standard file is separately resampled to new pixel dimensions. The new numbers of vertical and horizontal pixels depend upon the resolution of the printhead to be used for the particular color and the number of steps in the direction of transport of the receiver substrate required to cover the length of the image. Next, for each resampled color plane, the 8-bit pixel values are transformed into a new 10-bit value that is an index for a lookup which will later be used in the generation of a particular pulse pattern to be sent to the printhead.

The foregoing steps are conveniently carried out in software running on a CPU within image data processor 314 that has been so programmed. The data thereby generated may, in one embodiment, be sent to a second, dedicated processor via a memory buffer interface. The second processor may be a Field Programmable Gate Array (FPGA). The FPGA performs the functions of a pattern generator and a clock. The 10-bit lookup index value described above is used, in conjunction with patterns pre-programmed into the FPGA, to generate the actual pulse pattern to be sent to the printhead. The pulse pattern for a particular color is then sent to its associated printhead at a rate determined by the FPGA clock. The rates at which the pulse patterns for each color plane are sent are such that each monochrome image is the same length when printed. Temporal offsets are added to the start of the processes of sending the pulse patterns for each color, so that each monochrome image overlies the others as accurately as possible in the final print. The foregoing is described in greater detail in U.S. patent application Ser. No. 09/817,932, filed Mar. 27, 2001, entitled "Digital Halftoning", having inventors: Dan Bybell, Jay Thornton, and Dana Schuh which is assigned to the assignee of the instant application and which, along with all of its incorporated-by-reference patents and patent applications, is hereby incorporated by reference herein in its entirety.

In operation, a first number of thermal elements 302A in thermal print head 302 are operatively coupled via bus 307 to pulse generator 306. A second number of thermal elements 303A in thermal print head 303 are separately operatively coupled via bus 307 to pulse generator 306. Likewise, a third number of thermal elements 304A in thermal print head 304 are separately operatively coupled via bus 307 to pulse generator 306. All of thermal elements 302A are energized by a first pulse train having a first cycle time. All of thermal elements 303A are energized by a second pulse train having a second cycle time. And, all of thermal elements 304A are energized by a third pulse train having a third cycle time. These cycle times are not necessarily synchronized between print heads, and are set to achieve the appropriate number of dots per inch on the receptor substrate for each one. By comparison, in an alternative embodiment of the present invention, under certain circumstances that would warrant application of this alternative embodiment, patterns of dots may be randomly spaced in the horizontal direction of motion of the substrate while they remain regularly spaced on the substrate in the orthogonal vertical direction. In this alternative embodiment, different numbers of thermal elements per inch per print head are employed, and are located in that vertical direction providing intentional misregistration. More detail with regard to the structure and operation of a tandem print head thermal imaging machine is presented in certain of the incorporated by reference patents and patent applications.

In FIG. 4, receptor substrate 301 from FIG. 3 is again shown, this time containing horizontal rows and vertical columns of dots corresponding, for example, to the monochromatic pattern shown directly to the right of print head 302A in FIG. 3. The vertical column of dots has fixed distance 309 forming one dimension of the field of view of the image. In actual practice, the dot density may be in the range of 100 to 400 per inch, or greater. Only several dots are shown in the diagram as representative dots to enhance clarity of presentation.

There is also shown a train of electrical pulse bursts 401, 402, and 403 which are generated by the pulse generator 306 from one of its output terminals (not shown), each burst energizing the same thermal heating element. Pulse burst 401 is responsible for causing the deposition of only one of the dots in the right-most column shown, for example, the dot in the top-most row. Pulse burst 401 occurs earlier in time than either burst 402 or 403. Accordingly, pulse burst 402 is likewise responsible for causing deposition of only the topmost dot in the middle column, and pulse burst 403 is likewise responsible for causing deposition of only the topmost dot in the left hand column. The amount of ink deposited in each of these three dots can vary as a function of the three individual pulse bursts. The bursts can have different characteristics, one from the other. For example, they can have different pulse amplitudes, duty cycles and/or number of pulses per burst from each other. In this example, thus far, dots of a single color have been deposited on an otherwise blank substrate.

The pulse characteristics are controlled by image data processor 314 operating through pulse generator 306. It should be understood that each thermal unit heating element 302A in print head 302 may be separately addressed, so as to satisfy requirements of the image data being processed, resulting in a dot pattern across the field of view of the image wherein each such dot is potentially unique and not necessarily replicated by any other dot in the pattern. Time intervals "T1" between successive pulse bursts are substantially equal to permit the composition of a row of dots in a monochromatic pattern on the substrate having substantially equal distances between successive dots. In a preferred embodiment of the present invention, every-other horizontal row of dots is offset or displaced horizontally from its otherwise vertical column of dots (giving each dot more "breathing space"), which is achieved by having an offset starting time for each pulse burst applied to every other print head element in the vertical column of elements. (A pattern produced by this offset for every other row is shown in FIGS. 7A–D.)

To achieve a second pattern of dots superimposed on the first pattern, another print head, such as print head 303 in the tandem machine of FIG. 3A can be used. For this other print head, a separate set of outputs from pulse generator 306 are operatively coupled to its thermal elements 303A. Time T1 could be set by computer 314 to a different interval from that shown in FIG. 4 to permit deposition of another row of dots in a second monochromatic pattern on the same substrate having substantially equal horizontal distances from dot to dot where such distances are different from those in the first pattern. This would provide a misregistered dot pattern of two colors in the horizontal row direction. To achieve a third pattern of dots superimposed on the first two patterns, this process is again repeated with print head 304 and with a third separate set of output terminals from the pulse generator connected to print head elements 304A. Time T1 could be set either to the same interval as that associated with either one of the first two colors deposited, or else yet a third interval. As discussed above, when the three primary colors of cyan, magenta and yellow are used, the misregistration should be chosen such that the dot pattern associated with magenta is different from that associated with the other two colors, which can be the same as each other. The order of printing of colors is immaterial. Therefore, it is only necessary for the operation of the present invention that at least one of the printheads used have a different resolution than any one of the others, and that for this printhead time T1 should be set to a different interval than that of any one of the others. Distances (whether linear or arcuate) between print heads and speed of substrate motion are taken into account by processor 314 in determining precisely when to apply electrical excitation to each of the thermal elements (302A, 303A, and 304A) in the print heads to achieve the desired result.

Figure 5:
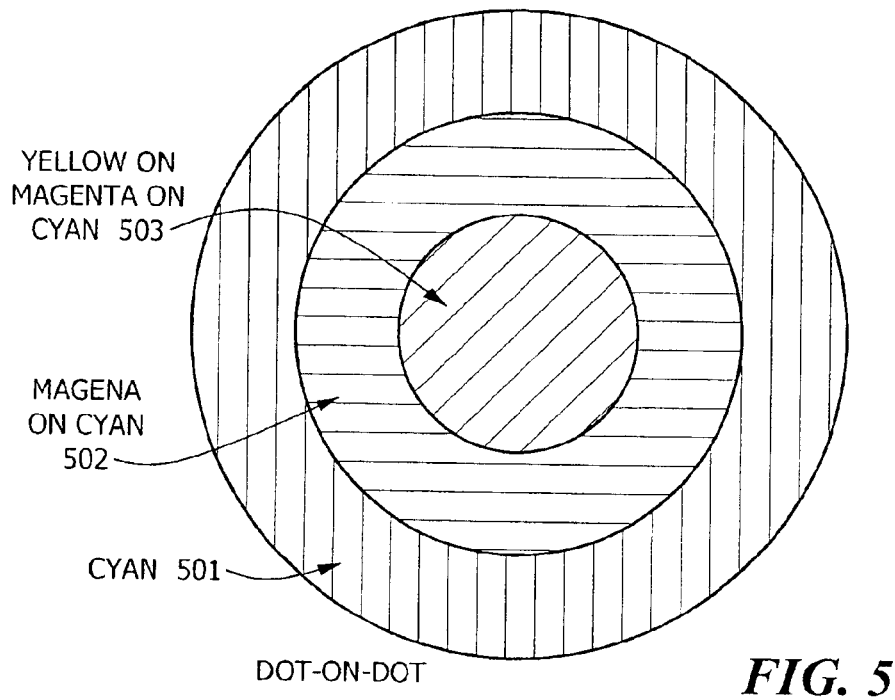
FIG. 5 is a schematic diagram of a single dot produced by a "dot-on-dot" technique.
Figure 6:
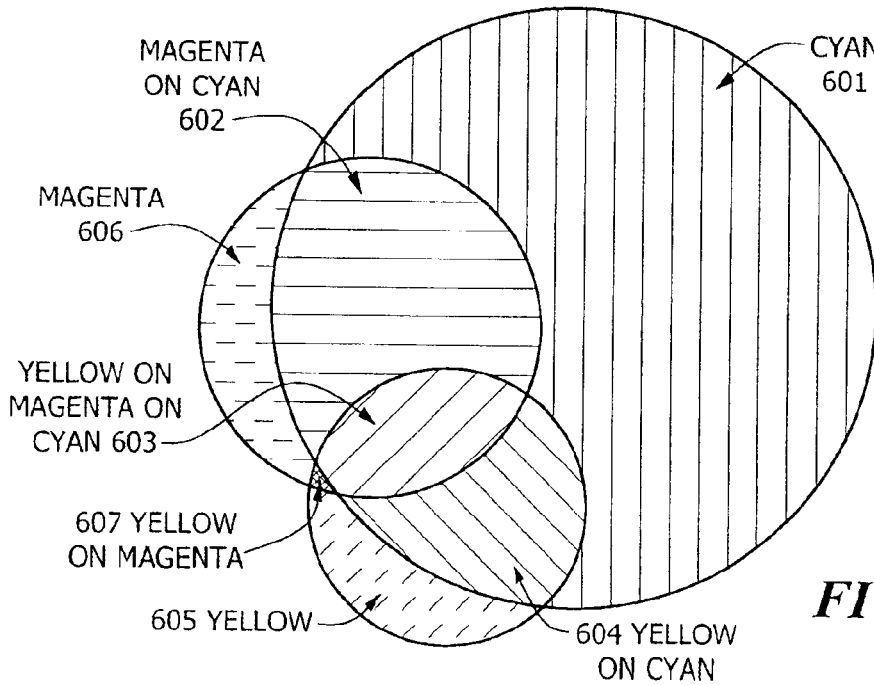
FIG. 6 is a schematic diagram of an example of a single dot which may be produced by operation of embodiments of the present invention; and, FIGS. 7A, 7B, 7C, and 7D are schematic diagrams of two-pattern examples of overlayed dots of different color, constructed from both the "dot-on-dot" technique and from embodiments based on principles of the present invention, where both examples reflect the same perturbation derived from a simulated mechanical misalignment, allowing a comparison of the resulting patterns that may be obtained.

FIGS. 5 & 6—Aligned and Mis-aligned Dots

FIG. 5 is a schematic diagram of a single dot produced by a "dot-on-dot" registration technique. This can be produced by thermal wax transfer, dye-diffusion-thermal-transfer (D2T2), ink jet processes or other methods. Color 501 represented by vertical cross hatching can be cyan. Color 502 represented by horizontal cross hatching can be magenta on top of cyan. And, color 503, represented by forty-five degree cross hatching can be yellow on top of magenta on top of cyan. This particular exemplary dot is essentially a perfect "bulls-eye" where the contributions of each color are intended be shown as concentric circles. This is achievable in practice, but not with predictable repeatability from dot to dot. In other words, succeeding dots in the pattern (not shown in this Fig.), although they may have ink properly registered in a superimposed manner, may not necessarily form circles or bulls-eyes on a steadily repeatable basis. However, as long as the overlaying ink stays on top of the underlying ink which was its target, the overall color contribution from that dot remains essentially the same as that from a bulls-eye dot having the same color percentages. In the single head machine this is more readily achievable since the transverse misalignment between heads is not a factor, in contrast with such misalignment potential inherent in the multi-head machine as enumerated in the Background section hereinabove. As earlier noted, the actual dimensions of this dot may be on the order of a 10–100 micron diameter.

FIG. 6 is a schematic diagram of an example of a single misregistered or misaligned dot, out of a pattern or field of misregistered or misaligned dots. This dot may be intentionally misregistered by operation of embodiments of the present invention. Alternatively, such a dot may represent an example of an unintentionally misaligned dot resulting from mechanical misalignment problems in a multi head thermal printer. Embodiments of the present invention control the pattern of the intentionally mis-registered dots in a novel and predetermined manner to mask or diminish impact of optical effects otherwise produced by unintentionally misaligned dots. Thereby, a desired optically-observable result is produced across the field of view of the image, the explanation of which shall be provided in detail hereinbelow and in connection with a discussion of FIG. 7.

Color 601 represented by vertical cross hatching can be cyan. Color 602 represented by horizontal cross hatching can be magenta on top of cyan. Color 603 represented by positive forty-five degree cross hatching can be yellow on top of magenta on top of cyan. Color 604 represented by negative forty-five degree cross hatching can be yellow on cyan. Color 605 represented by positive forty-five degree dashes has mis-registered and is yellow. Color 606 represented by negative forty-five degree dashes has mis-registered and is magenta. And color 607, represented by "Xs" is the mis-registered overlap of yellow on magenta.

There is a difference between the reflectivity contributions from the dots in FIGS. 5 and 6. First, it should be observed that the percentages of cyan, magenta on cyan, and yellow on magenta on cyan in FIG. 5 are different from the percentages of cyan, magenta on cyan, and yellow on magenta on cyan respectively in FIG. 6. For example, more cyan is exposed in FIG. 6 than in FIG. 5 and less yellow on magenta on cyan is exposed in FIG. 6 than in FIG. 5. Moreover, there are other spectral contributions from the dot of FIG. 6 that do not appear in the dot of FIG. 5. For example, yellow on cyan alone and yellow on magenta alone in the dot of FIG. 6 do not appear in the dot of FIG. 5. The result of these variations is a different overall reflectivity contribution from the dot of FIG. 6 as compared to the dot of FIG. 5, in both light intensity and color, for reasons explained hereinabove in the Background section. If this different reflectivity contribution is maintained over a neighborhood of dots, it will be noticeable by the human observer of the overall image. With mechanical misalignment in a tandem system, such problems can develop, because neighboring dots can be similarly afflicted, and perceptible differences between sections of an image can emerge.

Embodiments of the present invention utilize intentional misregistration between superimposed dot patterns in a manner to compensate for dot pattern misalignment created by mechanical misalignment. As earlier discussed, a particular embodiment in accordance with principles of the present invention employs a multi-head thermal print machine utilizing two different predetermined numbers of thermal print elements thereby providing a pattern of intended misregistration in the column direction. For example, a first print head may contain 300 print head elements per inch and a second print head may contain 400 print head elements per inch. At the same time, there is a pattern of intended misregistration imposed orthogonally, in the row direction, the direction of motion of the moving substrate, by allowing the first print head to lay-down dots at, for example 400 per inch and the second print head to lay down dots at, for example, 266 per inch. The first print head thus lays down dots that are more squeezed together in the direction of motion of the substrate (rows of 400/inch) and stretched out in the direction perpendicular to that direction (columns of 300/inch). And, the second print head lays down dots in a reverse pattern: the dots are more stretched-out in the direction of motion (rows of only 266/inch) and more squeezed in the direction perpendicular to the direction of motion (columns of 400/inch). This orthogonally-controlled and intentional misregistration between dot patterns is an important discovery and development since it reduces or eliminates the otherwise noticeable optical artifacts produced by misalignment of multi-head printers or other processes intended to register one repetitive pattern of dots with another.

FIGS. 7A, 7B, 7C, & 7D—Dot-On-Dot Registration and Registration in Accordance with Principles of the Present Invention FIGS. 7A–D show the same pattern of dots produced by both a dot-on-dot technique and another technique in accordance with principles of the present invention. As will be explained below, there is a large dot-overlap-variation resulting from a mechanical perturbation or mechanical misalignment in a dot-on-dot scheme, as compared with a minimal dot-overlap-variation resulting from the same perturbation or misalignment in the intentional misregistration scheme of the present invention. In each Figure, the substrate is moving horizontally from left to right as in prior Figures. Vertical formations are columns and horizontal formations are rows.

Figure 7A:
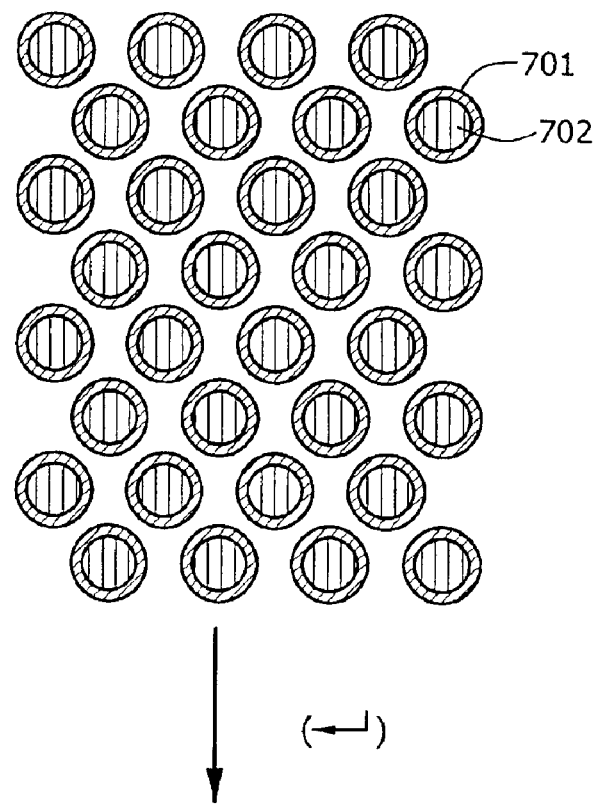
Figure 7B:
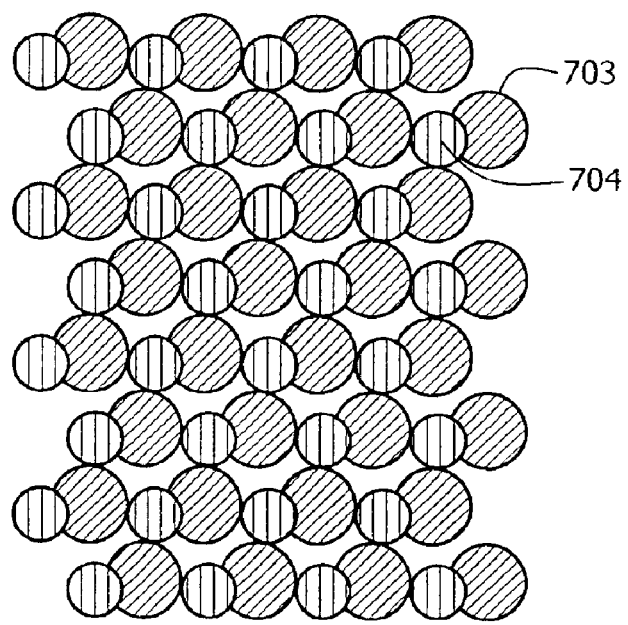

FIG. 7A shows a dot-on-dot pattern of two colors printed with perfect alignment; the overlayed dots form concentric circles. One color is represented by the large dots with slanted hatching (such as the dot labeled 701), the other by smaller dots with vertical hatching (such as the dot labeled 702). The dot spacing is such as might be obtained from printing each of the two patterns at 300 dots per inch from top to bottom (300 horizontal rows per inch), and 400 dots per inch from left to right (400 vertical columns per inch). An area of about 8 dots by 8 dots is represented, corresponding to a true dimension of about 0.0005 square inches. This is so small that the individual dots would be invisible to the unaided eye. FIG. 7B shows the same pattern as that of FIG. 7A, but where the pattern of smaller dots has been displaced relative to the pattern of larger dots. This displacement can be due to mechanical perturbation or misalignment resulting in horizontal and vertical translations represented by the bent arrow shown. The translations are such that dots 701 and 702 in FIG. 7A have been mapped to dots 703 and 704 respectively in FIG. 7B. Clearly, the average area of dot overlap is much smaller in FIG. 7B than in FIG. 7A. As can be concluded from the discussion presented earlier, this large macro-variation in dot overlap will result in noticeable color shift and/or other visual artifacts between the images produced by the dot patterns of FIGS. 7A and 7B.

Figure 7C:
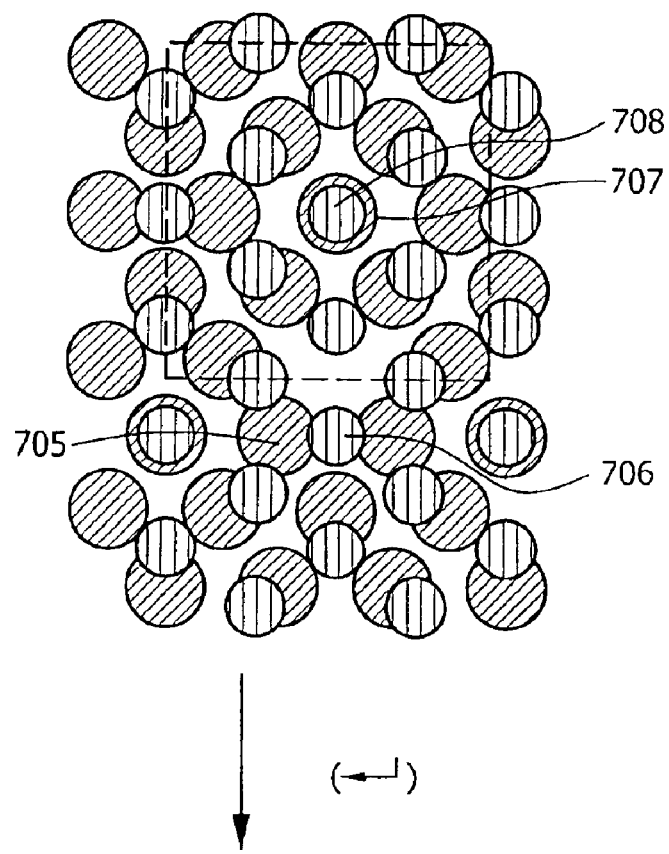
Figure 7D:
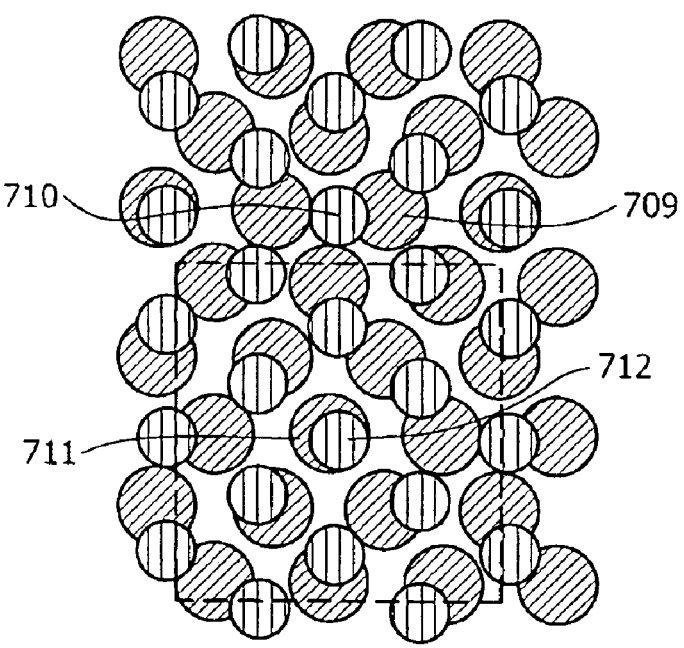

By contrast, FIGS. 7C and 7D show the effect of horizontal and vertical displacements which are the same as those reflected in FIGS. 7A and 7B upon a dot pattern produced by operation of embodiments of the present invention. FIG. 7C shows the same pattern of larger dots as FIG. 7A (a 300 row per inch by 400 column per inch pattern), but overlaid by a different pattern of smaller dots which represents 400 dots per inch from top to bottom (400 rows per inch), and 266 dots per inch from left to right (266 columns per inch). Thus FIG. 7C shows a 300 by 400 dpi pattern underlying a 400 by 266 dpi pattern. Dots 707 and 708 happen to be coincident and concentric in FIG. 7C, and are mapped to dots 709 and 710 respectively in FIG. 7D. This is exactly the same mapping as occurred when dots 701 and 702 were mapped to 703 and 704 in FIGS. 7A and 7B. However, in contrast to FIGS. 7A/7B, in FIGS. 7C/7D there are also cases wherein dots were not coincident to start with, but became more coincident after the displacement. For example, dots 705 and 706 in FIG. 7C, which are not coincident, become mapped to dots 711 and 712 in FIG. 7D, which are coincident. The result is that the average dot overlap is changed very little by the mapping. Indeed, the pattern of dots remains almost the same, albeit displaced. This can be seen by considering the dotted rectangle around dots 707 and 708 in FIG. 7C, which defines the boundary of a "rosette" pattern. After the perturbation-derived displacement of the smaller dots, which forms the pattern of FIG. 7D, the rosette pattern re-appears around coincident dots 711 and 712. Since color shifts caused by misalignments are related to dot overlap variation between the images, as described above, the color shifts from FIG. 7C to FIG. 7D would be expected to be minimal, which is indeed the case as reflected by data in Tables 1 and 2 hereinbelow.

Recapitulating, the widespread dot misregistration in FIG. 7D is intentional and tends to mask any unintended misregistrations due to noted mechanical misalignment of print heads or from other extraneous perturbations. As noted below, the use of different dot repetition patterns also introduces a moire pattern into the image, but the spatial frequency of the moire pattern (i.e., the "beat" pattern) between the two dot patterns used in the present invention can be kept sufficiently high as to be undetected without magnification assistance. Accordingly, while any perturbation-derived misregistrations tend to become masked, or tend to be made more forgiving, by the pattern of pre-existing intentional misregistrations, the intentional misregistrations, which are generated in the particularly novel manner detailed herein, are not discernable.

The choice of these unique combinations of different row numbers (a function of the number of print head elements) and different column numbers (a function of the number of excitations per unit time and the speed of translation of the receiver substrate) may be made in accordance with the following analysis and explanation. A difference in perceived color and lightness may be estimated within the CIELAB system of color co-ordinates by computation of a "distance" within this space, $\Delta E^*$, as described for example in "Color and its Reproduction" by Gary G. Field, GATFPress, Pittsburgh, Pa., 1999. (CIELAB is the second of two systems adopted by CIE—the Comission Internationale de l'Eclairage—the International Commission on Illumination.) With knowledge of the absorption spectra of a particular set of dyes, and the light-scattering properties of the receiver substrate, it is possible to compute the maximum difference in perceived color, as approximated by $\Delta E^*$, between any two patterns of printed dots using that set of dyes. The perceived color difference is generally greatest in misregistration between magenta and cyan dot patterns (since the human visual acuity is greatest in green and red light), assuming typical dye spectral overlap. Accordingly, the space of possible colors accessible by all possible relative positionings of particular patterns of magenta and cyan dots, of all possible sizes, can be explored, and the maximum excursion of $\Delta E^*$ values can be found. When this exercise is carried out for a variety of different dot patterns using typical cyan and magenta dyes, the results obtained are as shown in Table 1. In Table 1, the dot pattern used is that obtained by printing every even-numbered pixel in the print-head, then moving the receiver one step perpendicular to the printhead and printing every odd-numbered pixel. The number of printhead elements per inch (which results in a fixed number of printed dots per inch, or "dpi") is referred to as "row resolution" in Table 1 (i.e., the number of rows per inch), while the number of receiver steps per inch is referred to as the "column resolution". (*A dot pattern in accordance with "P.I" means a pattern constructed from operation of embodiments that are in accordance with principles of the Present Invention.)

TABLE 1

| Row Resolution, magenta | Column Resolution, magenta | Row Resolution, cyan | Column Resolution, cyan | Dot Pattern | $\Delta E^*$ |
|---|---|---|---|---|---|
| 300 | 375 | 300 | 375 | Dot-on-dot | 22.5 |
| 400 | 400 | 300 | 300 | P.I.* | 0.523 |
| 300 | 520 | 400 | 300 | P.I. | 0.323 |
| 300 | 400 | 400 | 266 | P.I. | 0.893 |

Table 1 shows the worst-case color differences obtained with the given patterns. This does not necessarily occur between the same two color shades, or with the same misregistration, in each of the cases. It may be seen that, for the three patterns in Table 1 in accordance with the present invention (in which both column resolution and row resolution differ between the two colors), peak color shift is far smaller than in the control case (attempted dot-on-dot printing).

Table 1 shows that there is not very much difference between color shifts obtained using three different patterns that illustrate the present invention. The choice between various patterns of the present invention may however be aided by other considerations. Chief among these is the visibility of the so-called moire pattern generated by the particular combination of dot patterns. Visibility of the moire pattern may be computed in a manner similar to that used for the color difference analysis described above, but in this case spatial filtering according to human spatial frequency perception is applied to the luminance (brightness) and chrominance (hue) channels of the moire pattern. This may be done for a particular viewing distance (herein chosen to be 8") as described in "A Spatial Extension to CIELAB for Digital Color Image Reproductions", by X. M. Zhang and B. Wandell, Proceedings of the SID Symposiums, 1996. An "index of visibility" of the moire pattern may be calculated, for the 8" viewing distance, by measuring the distance in spatially-filtered CIELAB color space (S-CIELAB) between average color of the whole pattern, and color at each point on a grid whose resolution is much finer than that of the dots and whose area covers the entire "repeat unit" of the two-dimensional dot pattern. The "index of visibility", in $\Delta E^*$ units, is obtained by ordering the difference measurements obtained at each point on the grid from lowest to highest, and taking the value at the 95th percentile. This value is shown in Table 2.

TABLE 2

| Row Resolution, magenta | Column Resolution, magenta | Row Resolution, cyan | Column Resolution, cyan | Dot Pattern | Moire Index of Visibility |
|---|---|---|---|---|---|
| 300 | 375 | 300 | 375 | Dot-on-dot | N/A |
| 400 | 400 | 300 | 300 | P.I.* | 4.07 |
| 300 | 520 | 400 | 300 | P.I. | 2.19 |
| 300 | 400 | 400 | 266 | P.I. | 3.11 |

The higher the moire index of visibility, the more visible the pattern actually is. Therefore, it can be seen that the best pattern in this regard is that of the third row in Table 2. However, it may not be the preferred pattern for yet other reasons. For example, this pattern requires higher resolution of the medium (maximum 520 dpi) than does the pattern in the fourth row (maximum 400 dpi), and it may be that the particular donor and receiver are not capable of the higher resolution.

The present embodiments are to be considered in all respects as illustrative and not restrictive. For example, in an alternative embodiment, dots in the dot patterns can be randomly positioned in the direction of substrate motion while being regularly positioned or equally spaced along the orthogonal direction, with selective misregistration between the patterns being obtained from print heads having different numbers of thermal elements per head. Further, any process which uses dots to create images, such as, for example, ink jet, thermal wax transfer, dye-diffusion/thermal-transfer (D2T2), and others used in the printing press arts may benefit from use of embodiments constructed in accordance with principles of the present invention. The scope of the invention, therefore, is indicated by the appended claims rather than by the foregoing description, and all changes which come within the meaning and range of equivalency of the claims are therefore intended to be embraced therein.

What is claimed is:

1. A system for enhancing a color image as perceived by a human viewer, said image being composed of a plurality of superimposed dot-patterns upon a portion of a movable curved surface having two orthogonal spatial dimensions and having curvature in only one of said dimensions, the direction of motion of said surface being in said one of said dimensions, each one of said patterns being monochromatic and different in color from color of each other of said patterns, said system comprising:

means for intentionally misregistering the dots of at least one of said dot patterns with respect to the dots of at least one of said other of said patterns in directions both parallel to and perpendicular to said direction of motion to obtain a misregistration pattern;

wherein said dot patterns are comprised of a plurality of dots being randomly spaced on said surface in said only one of said dimensions and being regularly spaced on said surface along the other of said dimensions; and means for controlling said misregistration pattern to obtain a particular misregistration having the property of said enhancing said color image while said particular misregistration is not perceptible to said viewer.

2. The system of claim 1 and wherein said enhancing said color image includes at least enhancing color uniformity of said image.

3. The system of claim 1 and wherein said curved surface is elliptical.

4. The system of claim 1 and wherein said curved surface is cylindrical.

5. The system of claim 1 and wherein said dots are positioned on said surface at first spatial frequencies too high to be perceived as individual dots by an unaided eye of said human viewer, and wherein said misregistration pattern forms a new pattern having other spatial frequencies likewise too high to be perceived as individual dots by an unaided eye of said human viewer.

6. A Apparatus for enhancing a color image as perceived by a human viewer, said image being composed of a plurality of superimposed dot-patterns upon a portion of a movable curved surface having two orthogonal spatial dimensions and having curvature in only one of said dimensions, the direction of motion of said surface being in said one of said dimensions, each one of said patterns being monochromatic and different in color from color of each other of said patterns, said apparatus comprising:

apparatus for intentionally misregistering the dots of at least one of said dot patterns with respect to the dots of at least one of said other of said patterns in directions both parallel to and perpendicular to said direction of motion to obtain a misregistration pattern;

wherein said dot patterns are comprised of a plurality of dots being randomly spaced on said surface in said only one of said dimensions and being regularly spaced on said surface along the other of said dimensions; and, control apparatus for controlling said misregistration pattern to obtain a particular misregistration having the property of said enhancing said color image while said particular misregistration is not perceptible to said viewer.

7. The apparatus of claim 6 and wherein said enhancing said color image includes at least enhancing color uniformity of said image.

8. The apparatus of claim 6 and wherein said curved surface is elliptical.

9. The apparatus of claim 6 and wherein said curved surface is cylindrical.

10. The apparatus of claim 6 and wherein said dots are positioned on said surface at first spatial frequencies too high to be perceived as individual dots by an unaided eye of said human viewer, and wherein said misregistration pattern forms a new pattern having other spatial frequencies likewise too high to be perceived as individual dots by an unaided eye of said human viewer.

11. In a computer-controlled system for enhancing a color image as perceived by a human viewer, said image being composed of a plurality of superimposed dot-patterns upon a portion of a movable curved surface having two orthogonal spatial dimensions and having curvature in only one of said dimensions, the direction of motion of said surface being in said one of said dimensions, each one of said patterns being monochromatic and different in color from color of each other of said patterns, said surface moving in a first direction parallel to said surface, a computer program product for use in said system, said computer program product including a computer usable medium having computer readable program code thereon, said computer readable program code comprising:

program code for intentionally misregistering the dots of at least one of said dot patterns with respect to the dots of at least one of said other of said patterns in directions both parallel to and perpendicular to said direction of motion to obtain a misregistration pattern;

wherein said dot patterns are comprised of a plurality of dots being randomly spaced on said surface in said only one of said dimensions and being regularly spaced on said surface along the other of said dimensions; and, program code for controlling said misregistration pattern to obtain a particular misregistration having the property of said enhancing said color image while said particular misregistration is not perceptible to said viewer.

12. The computer program product of claim 11 and wherein said enhancing said color image includes at least enhancing color uniformity of said image.

13. The computer program product of claim 11 and wherein said curved surface is elliptical.

14. The computer program product of claim 11 and wherein said curved surface is cylindrical.

15. The computer program product of claim 11 wherein said dots are positioned on said surface at first spatial frequencies too high to be perceived as individual dots by an unaided eye of said human viewer, and wherein said misregistration pattern forms a new pattern having other spatial frequencies likewise too high to be perceived as individual dots by an unaided eye of said human viewer.

16. A method for enhancing a color image as perceived by a human viewer, said image being composed of a plurality of superimposed dot-patterns upon a portion of a movable curved surface having two orthogonal spatial dimensions and having curvature in only one of said dimensions, the direction of motion of said surface being in said one of said dimensions, each one of said patterns being monochromatic and different in color from color of each other of said patterns, said method comprising:

intentionally misregistering at least the dots of one of said dot patterns with respect to the dots of at least one of said other of said patterns in directions both parallel to and perpendicular to said direction of motion to obtain a misregistration pattern;

wherein said dot patterns are comprised of a plurality of dots being randomly spaced on said surface in said only one of said dimensions and being regularly spaced on said surface along the other of said dimensions; and, controlling said misregistration pattern to obtain a particular misregistration having the property of said enhancing said color image while said particular misregistration is not perceptible to said viewer.

17. The method of claim 16 and wherein said enhancing said color image includes at least enhancing color uniformity of said image.

18. The method of claim 16 and wherein said curved surface is elliptical.

19. The method of claim 16 and wherein said curved surface is cylindrical.

20. The method of claim 16 and wherein said dots are positioned on said surface at first spatial frequencies too high to be perceived as individual dots by an unaided eye of said human viewer, and wherein said misregistration pattern forms a new pattern having other spatial frequencies likewise too high to be perceived as individual dots by an unaided eye of said human viewer.

21. A system for enhancing a color image as perceived by a human viewer, said image being composed of a plurality of superimposed dot-patterns upon a portion of a movable curved surface having two orthogonal spatial dimensions and having curvature in only one of said dimensions, the direction of motion of said surface being in said one of said dimensions, each one of said patterns being monochromatic and different in color from color of each other of said patterns, said system comprising:

a linear array of printing elements, each one of said printing elements adapted to produce a dot of a color onto said curved surface, said linear array of printing elements extending across substantially the entire width of said curved surface, the width of said curved surface being the dimension perpendicular to the direction of travel;

means for intentionally misregistering the dots of at least one of said dot patterns with respect to the dots of at least one of said other of said patterns in directions both parallel to and perpendicular to said direction of motion to obtain a misregistration pattern; and means for controlling said misregistration pattern to obtain a particular misregistration having the property of said enhancing said color image while said particular misregistration is not perceptible to said viewer.

22. The system of claim 21 wherein said dot patterns are comprised of a plurality of dots being randomly spaced on said surface in said only one of said dimensions and being regularly spaced on said surface along the other of said dimensions.

23. The system of claim 21 wherein said dots are positioned on said surface at first spatial frequencies too high to be perceived as individual dots by an unaided eye of said human viewer, and wherein said misregistration pattern forms a new pattern having other spatial frequencies likewise too high to be perceived as individual dots by an unaided eye of said human viewer.

24. Apparatus for enhancing a color image as perceived by a human viewer, said image being composed of a plurality of superimposed dot-patterns upon a portion of a movable curved surface having two orthogonal spatial dimensions and having curvature in only one of said dimensions, the direction of motion of said surface being in said one of said dimensions, each one of said patterns being monochromatic and different in color from color of each other of said patterns, said apparatus comprising:

a linear array of printing elements, each one of said printing elements adapted to produce a dot of a color onto said curved surface, said linear array of printing elements extending across substantially the entire width of said curved surface, the width of said curved surface being the dimension perpendicular to the direction of travel;

apparatus for intentionally misregistering the dots of at least one of said dot patterns with respect to the dots of at least one of said other of said patterns in directions both parallel to and perpendicular to said direction of motion to obtain a misregistration pattern; and control apparatus for controlling said misregistration pattern to obtain a particular misregistration having the property of said enhancing said color image while said particular misregistration is not perceptible to said viewer.

25. The apparatus of claim 24 wherein said dot patterns are comprised of a plurality of dots being randomly spaced on said surface in said only one of said dimensions and being regularly spaced on said surface along the other of said dimensions.

26. The apparatus of claim 24 wherein said dots are positioned on said surface at first spatial frequencies too high to be perceived as individual dots by an unaided eye of said human viewer, and wherein said misregistration pattern forms a new pattern having other spatial frequencies likewise too high to be perceived as individual dots by an unaided eye of said human viewer.

27. A method for enhancing a color image as perceived by a human viewer, said image being composed of a plurality of superimposed dot-patterns upon a portion of a movable curved surface having two orthogonal spatial dimensions and having curvature in only one of said dimensions, the direction of motion of said surface being in said one of said dimensions, each one of said patterns being monochromatic and different in color from color of each other of said patterns, said method comprising:

forming said dot patterns with a linear array of printing elements, each one of said printing elements adapted to produce a dot of a color onto said curved surface, said linear array of printing elements extending across substantially the entire width of said curved surface, the width of said curved surface being the dimension perpendicular to the direction of travel;

intentionally misregistering the dots of at least one of said dot patterns with respect to the dots of at least one of said other of said patterns in directions both parallel to and perpendicular to said direction of motion to obtain a misregistration pattern; and controlling said misregistration pattern to obtain a particular misregistration having the property of said enhancing said color image while said particular misregistration is not perceptible to said viewer.

28. The method of claim 27 wherein said dot patterns are comprised of a plurality of dots being randomly spaced on said surface in said only one of said dimensions and being regularly spaced on said surface along the other of said dimensions.

29. The method of claim 27 wherein said dots are positioned on said surface at first spatial frequencies too high to be perceived as individual dots by an unaided eye of said human viewer, and wherein said misregistration pattern forms a new pattern having other spatial frequencies likewise too high to be perceived as individual dots by an unaided eye of said human viewer.

* * * * *